(12) United States Patent
Chaumonnot et al.

(10) Patent No.: US 8,435,912 B2
(45) Date of Patent: May 7, 2013

(54) CATALYST BASED ON AN ORGANIC-INORGANIC HYBRID SUPPORT AND ITS USE IN HYDROREFINING AND HYDROCONVERSION

(75) Inventors: Alexandra Chaumonnot, Lyons (FR); Denis Guillaume, Vienne (FR); Benoit Fremon, Lyons (FR); Karin Marchand, Lyons (FR); Renaud Revel, Serpaize (FR)

(73) Assignee: IFP Energies Noevelles, Rueil Malmaison Cedex (FR)

( * ) Notice: Subject to any disclaimer, the term of this patent is extended or adjusted under 35 U.S.C. 154(b) by 769 days.

(21) Appl. No.: 12/375,757

(22) PCT Filed: Jul. 6, 2007

(86) PCT No.: PCT/FR2007/001169
§ 371 (c)(1),
(2), (4) Date: Jan. 29, 2010

(87) PCT Pub. No.: WO2008/015323
PCT Pub. Date: Feb. 7, 2008

(65) Prior Publication Data
US 2010/0133147 A1 Jun. 3, 2010

(30) Foreign Application Priority Data
Jul. 31, 2006 (FR) ...................................... 06 07048

(51) Int. Cl.
*C10G 45/00* (2006.01)
(52) U.S. Cl.
USPC ........... 502/158; 502/162; 502/167; 502/241; 502/246; 502/247; 502/258; 502/259; 502/260; 502/401
(58) Field of Classification Search ................. 502/158, 502/162, 167, 208–213, 241, 246–247, 258–260, 502/401
See application file for complete search history.

(56) References Cited

U.S. PATENT DOCUMENTS

| | | | |
|---|---|---|---|
| 4,064,154 A | 12/1977 | Chandra et al. | |
| 5,856,609 A * | 1/1999 | Wu et al. | 585/489 |
| 6,037,300 A | 3/2000 | Kasztelan et al. | |
| 2004/0230083 A1* | 11/2004 | Weisbeck et al. | 568/959 |
| 2005/0211603 A1 | 9/2005 | Guillaume et al. | |

FOREIGN PATENT DOCUMENTS

| | | |
|---|---|---|
| DE | 10 2004 039 277 A1 | 2/2006 |
| EP | 0 848 992 A1 | 6/1998 |
| EP | 1 579 909 A1 | 9/2005 |

OTHER PUBLICATIONS

Weisser, O. et al. (1973). Sulphide Catalysts, Their Properities and Applications, Pergamon Press, 506 pgs. (Office action cites p. 19).*
Wight, A.P. (2002). Chem. Rev., 102, 3589-3614.*
International Search Report of PCT/FR2007/001169 (Jan. 14, 2008).
R. Frantz et al., "Triisopropoxysilyl-Functionalized Oxide Nanoparticles Using a Di-tert-butyl Phosphonate Ester as the Surface Grafting Agent", Tetrahedron Letters, vol. 45, No. 14 (Mar. 29, 2004) pp. 2935-2937.

* cited by examiner

*Primary Examiner* — Walter D Griffin
*Assistant Examiner* — Brian McCaig
(74) *Attorney, Agent, or Firm* — Millen, White, Zelano & Branigan, P.C.

(57) ABSTRACT

A supported and sulphur-containing catalyst is described, comprising;
    a porous support constituted by an organic-inorganic hybrid material for which the covalent bond between the organic and inorganic phases conforms to the formula M-O—Z—R where M represents at least one metal constituting the inorganic phase, Z at least one heteroelement from among phosphorus and silicon and R an organic fragment,
    at least one metal of group VIB and/or of group VB and/or of group VIII.
The invention also relates to the use of this catalyst for the hydrorefining and the hydroconversion of hydrocarbon-containing feedstocks such as petroleum fractions, fractions from coal or biomass or hydrocarbons produced from natural gas.

24 Claims, No Drawings

CATALYST BASED ON AN ORGANIC-INORGANIC HYBRID SUPPORT AND ITS USE IN HYDROREFINING AND HYDROCONVERSION

TECHNICAL FIELD OF THE INVENTION

The present invention relates to the field of hydroconversion and hydrorefining. Its subject is a catalyst the support of which is an organic-inorganic hybrid material (OIHM), the said catalyst being used in hydroconversion and hydrorefining processes bringing into play reactions of hydrodesulphurization, hydrodenitrification, hydrodemetallization, hydrodeoxygenation, hydrodearomatization, hydrogenation of petroleum fractions.

STATE OF THE ART

The purpose of a catalyst for the hydrotreatment of hydrocarbon-containing fractions is to eliminate the sulphur- or nitrogen-containing compounds contained in the latter in order to for example match a petroleum product to the required specifications (sulphur content, aromatics content etc.) for a given application (automobile fuel, gasoline or gas oil, domestic fuel, jet fuel). It may also involve pre-treating this feedstock in order to eliminate the impurities from it before subjecting it to different conversion processes in order to modify its physico-chemical properties (reforming, hydrocracking vacuum distillates, hydroconversion of atmospheric or vacuum residues, etc.).

Hydrotreatment catalysts generally comprise at least one metal of group VIB and/or at least one metal of group VIII of the periodic table of the elements. The commonest formulations are of cobalt-molybdenum (CoMo), nickel-molybdenum (NiMo) and nickel-tungsten (NiW) type. These catalysts may be in solid form or indeed supported. In this latter case, the porous matrix is generally an amorphous or poorly crystallized oxide (alumina, silica-alumina, etc.) optionally combined with a zeolitic or non-zeolitic molecular sieve. After preparation, the said catalysts are often in oxide form. As their active and stable form for HDT processes is the sulphur-containing form, these catalysts must undergo a sulphurization stage. This can be realized in the actual hydrotreatment unit (when it is called in-situ sulphurization) or prior to the loading of the catalyst into the unit (when it is called ex-situ sulphurization).

The stepping-up of automobile pollution standards for horizon year 2009 in the European Community will force refiners to very greatly reduce the sulphur content of gas oils and gasolines, to at most 10 parts per million by weight (ppm) of sulphur in gas oils on 1 Jan. 2009, as against 50 ppm on 1 Jan. 2005 (measured using ASTM method D-4294). These constraints will be reflected in a demand for new refining units or a marked increase in the iso-volume activity of hydrotreatment catalysts. An effective means of increasing the activity of supported catalysts is to increase the quantity of sulphide active phase described above, which manifests itself in a maximum deposition of the associated oxide phase on the surface of the support. However, this maximum quantity (usually deposited by dry impregnation) is limited by the textural properties of the support and in particular its specific surface area and its pore volume. Moreover, in the particular case where the support used contains the element aluminium, this substantial concentration of deposited oxide phase encourages the formation of crystallized oxide phases of the type $Al_2(MoO_4)_3$, $CoAl_2O_4$, $NiAl_2O_4$, etc. which prove to be refractory at the sulphurization stage. This manifests itself logically in an indirect loss of catalytic activity, since almost all of the deposited oxide phase is not used to the maximum of its potential. On the other hand, an increase in the active phase content can lead to the formation of crystallites of $MoO_3$, $NiO$, $CoO$, $CO_3O_4$ or $CoMoO_4$ large enough to be detectable in DRX. These species are also known to reduce the degree of sulphurization of hydrotreatment catalysts, and therefore their performance levels.

In order to limit the formation of refractory phases, several lines of research have been followed. For example, patent EP0181035B1 shows that the use of complexing agents such as nitrilotriacetic acid (NTA) or ethylenediaminetetraacetic acid (EDTA) allows catalysts to be obtained that have a content by weight of oxide $MoO_3$ of up to 25% by weight on a silica-based support, yet are well known to a person skilled in the art for leading to weak precursors-support interactions and consequently to a poor dispersion of the active phase.

The option chosen in the case of patent EP0181035B1 is to complex the precursors in solution in order to control their interactions with the support and hence the dispersion of the active species.

A second possible option is to use a support that has itself been modified beforehand. Thus, the modification of the surface of a material by the so-called grafting technique is a technique commonly used to modify its surface properties. Generally speaking, this technique brings into play inorganic alkoxide precursors which lead finally to the doping of the surface of the support by a metallic element different from the metallic element constituting the solid matrix.

The modification of the surface of a catalyst support by an organic molecule leads to a so-called "hybrid" material. Depending on the nature of the organic-inorganic interface, two classes of organic-inorganic hybrid materials (OIHMs) are defined: OIHMs of class I where the cohesion of the organic and inorganic components is effected by weak interactions (H bonds, Van Der Waals bonds) and OIHMs of class II where the two phases are linked by strong covalent or iono-covalent bonds (C. Sanchez, B. Jullian, P. Belleville, M. Popall, J. Mater. Chem., 2005, 15(35-36), 3559). In this latter case, the introduction of an organic group results most often from the use of a precursor simultaneously possessing an inorganic group and groups that are hydrolysable and condensable, often of alkoxide or halide type. More specifically, two types of synthesis are usually encountered: direct synthesis which involves the direct incorporation, during the sol-gel synthesis of an inorganic solid, of this organic precursor in the presence of inorganic precursors well known to a person skilled in the art, and post-treatment synthesis, which involves obtaining a solid inorganic in a first stage, and functionalizing the surface, during a second stage, by hydrolysis/condensation reaction of the alkoxide and/or halide groups of the organic precursor with the hydroxyl surface groups (grafting technique) (A. Sayari, S. Hamoudi, Chem. Mater., 2001, 13, 3151). The first method cited has the advantage of permitting the incorporation of high levels of organic fragments compared with the post-treatment technique, which is limited by the surface condition of the initially formed solid. On the other hand, as the organic part is incorporated at the same time as the development of the inorganic framework, the accessibility of the organic sites is not total. Moreover, a stabilization of the inorganic framework by a high-temperature thermal treatment cannot be envisaged.

The introduction of an organic group for the materials of class II most often manifests itself in the formation of a bond M—O—Z—R where M is the metal constituting the chosen inorganic oxide matrix (M=Si, Al, Ti, Zr, etc.), Z a heteroelement from the hydrolysable groups of the organic precursor and R the organic fraction chosen to give the whole of the solid the desired properties. It is to be noted that the fragments R can also possess terminal functional groups such as —SO$_3$H, —N$^+$(CH$_3$)$_3$, —COONa, —NH$_2$, —CN, phenyl, chelating metallic function, etc. Z is frequently a silicon or phosphorus atom.

In the case where Z=Si, the organic precursors used are often of the family of the organoalkoxysilanes or the halides of organosilanes. Very many papers deal with the development of OIHMs by grafting of silyl precursors onto the surface of an inorganic oxide solid. We cite in particular the work of Kera et al., who used an OIHM obtained by grafting of the ligand y-anilinopropyltrimethoxysilane to the surface of various oxide supports in order to develop selective catalysts vis-à-vis the oxidation reaction of methanol in formaldehyde, these latter resulting from of a deposition of Anderson-type heteropolyanions (Xmo$_6$O$_{24}$$^{n-}$, X=Fe, Co, Ni) on the surface of the OIHM thus formed. The effect of using a OHIM here was to partly inhibit the reactivity of the initial inorganic support, this latter not favouring the selective obtaining of the product of the chemical reaction studied (Y. Kera, T, Oonaka, K. Yamanaka, S. Hirayama, H. Kominami, Applied Catalysis A: General, 2004, 276, 187).

In the case where Z=P, the modification of the mineral surfaces by phosphonic (a, X=OH), phosphinic (b, X=OH) acids or also by monoesters (c and c', X=OH) or diesters (d, X=OH) of phosphoric acid is already widely described (U.S. Pat. No. 4,788,176; WO04072120; EP1180396).

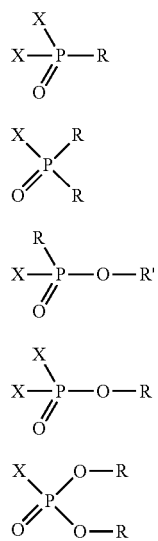

Similarly, surface modification by the esters (alkyl esters, X=OEt, OBu, etc.) or silyl esters (X=OSiMe$_3$) of phosphonic and phosphinic acids has also been reported (G. Guerrero, P. H. Mutin, A. Vioux, J. Mater. Chem., 2001, 11, 3161; R. Frantz, J.-O. Durand, M, Granier, G. P. Lanneau, Tet. Lett., 2004, 45, 2935).

Although less advanced than the OIHMs developed from silyl organic precursors, phosphorus-containing OHIMs can be used in a promising way in the field of composite materials, optics, electronics, catalysis and also separation.

The applicant found that the use of OHIM as a support for hydrorefining or hydroconversion catalyst had advantages in terms of catalytic activity and selectivity.

SUMMARY OF THE INVENTION

The invention relates to a supported and sulphur-containing catalyst, the said catalyst comprising:
- a porous support constituted by an organic-inorganic hybrid material (OIHM), the said OIHM having a covalent bond between the organic and inorganic phases, the said bond conforming to the formula M-O—Z—R where M represents at least one metal constituting the inorganic phase, Z at least one heteroelement from phosphorus and silicon from one or more organic precursor(s) and R an organic fragment of alkyl, aryl, alkoxy, aryl-alkyl type,
- at least one metal of group VIB and/or of group VB and/or of group VIII, the metal of group VIB being chosen from chromium, molybdenum and tungsten, the metal of group VB from vanadium, niobium and the metal of group VIII from iron, cobalt, nickel, ruthenium, palladium, osmium, iridium and platinum.

The said organic-inorganic hybrid material (OIHM) is obtained by post-treatment (so-called grafting technique) in the presence of organic precursors of an oxide inorganic matrix, generally constituted by at least one amorphous or poorly crystallized oxide, optionally combined with at least one zeolitic or non-zeolitic molecular sieve. The said OIHM is an OIHM of class II, the bond between the organic and inorganic phases being covalent in nature and conforming to the formula M-O—Z—R where M is at least one metal constituting the chosen inorganic oxide matrix, Z at least one heteroelement from phosphorus and silicon from the organic precursor and R the chosen organic fraction.

The said supported and sulphur-containing catalyst can optionally be doped by at least one of the elements chosen from phosphorus, boron, silicon and the halogens (group VIIA). Moreover, the present invention relates to the use of these catalysts in the hydrorefining and hydroconversion of hydrocarbon-containing feedstocks such as petroleum fractions, fractions from coal or biomass or hydrocarbons produced from natural gas, involving more particularly the reactions of hydrodesulphurization, hydrodenitrification, hydrodeoxygenation, hydrogenation, hydrodearomatisation, hydro-demetallization and hydroconversion of hydrocarbon-containing feedstocks containing aromatic and/or olefinic and/or naphthenic and/or paraffinic compounds, the said feedstocks optionally containing sulphur and/or nitrogen and/or oxygen and/or metals.

BENEFIT OF THE INVENTION

The catalyst according to the invention is a catalyst supported on an OIHM of class II obtained by the so-called grafting technique. The applicant found that the use of such a support leads to improved catalytic performances (activity, selectivity) compared with catalysts with a standard support. It can be presumed that these good results originate in a modification of the support—precursors interactions of the oxide phases, which are better controlled in the case of the invention.

DISCLOSURE OF THE INVENTION

The invention relates to a supported and sulphur-containing catalyst, the said catalyst comprising:
- a porous support constituted by an organic-inorganic hybrid material (OIHM), the said OIHM having a covalent bond between the organic and inorganic phases, the said bond conforming to the formula M-O—Z—R where M represents at least one metal constituting the inorganic phase, Z at least one heteroelement from phosphorus and silicon from one or more organic precursor(s) and R an organic fragment of alkyl, aryl, alkoxy, aryl-alkyl type, saturated or not, branched or not, and bearing or not one or more organic functional groups, at least one metal of group VIB and/or of group VB and/or of group VIII, the metal of group VIB being chosen from chromium, molybdenum and tungsten, the metal of group VB from vanadium, niobium and the metal of group VIII from iron, cobalt, nickel, ruthenium, palladium, osmium, iridium and platinum, and the catalyst with the active sulphide phase being obtained by sulphurization of the oxide phases.

The invention relates to a supported catalyst comprising at least one element of group VIB and/or of group VB and/or group VIII of the periodic table. The elements of group VIB are chosen from chromium, molybdenum and tungsten. According to the invention, these elements advantageously represent from 0.01 to 75% by weight relative to total mass of the catalyst in the oxide state according to the invention and preferably from 0.01 to 40% by weight. The elements of group VB are chosen from vanadium, niobium and tantalum. According to the invention, these elements advantageously represent from 0.01 to 40% by weight relative to the total mass of the catalyst in the oxide state according to the invention and preferably from 0.01 to 25% by weight. The elements of group VIII are chosen from iron, cobalt, nickel, ruthenium, rhodium, palladium, osmium, iridium and platinum, preferably from iron, cobalt, nickel, palladium and iridium and even more preferably from iron, cobalt, nickel. According to the invention, these elements advantageously represent from 0.01 to 30% by weight relative to the total mass of the catalyst in the oxide state according to the invention and preferably from 0.01 to 25% by weight. Among the precursor compounds of the oxide phases (themselves precursors of the sulphur-containing active phases) containing at least one element the atomic number of which is included in the set constituted by the elements of groups VIB, VB and VIII, the compounds of the following non-exhaustive list can be used: oxides, hydroxides, oxyhydroxides, acids, polyoxometallates, peroxomolybdates, alkoxides, oxalates, salts of ammonium, nitrates, carbonates, hydroxycarbonates, carboxylates, halides, oxyhalides, phosphates, hydrides, sulphides, thiosalts (in particular of ammonium), etc. Oxides and salts of transition metals are preferably used.

The supported catalyst according to the invention can also contain at least one doping element chosen from the group constituted by the following elements: phosphorus, silicon, boron and halogens of group VIIA of the periodic table, preferably the elements fluorine, chlorine, bromine and iodine. According to the invention, the elements P, Si contributed by doping advantageously represent from 0 to 40% by weight relative to the total mass of the catalyst in the oxide state according to the invention, preferably from 0.01 to 30% and very preferably from 0.01 to 20% by weight. Similarly, the halogen elements advantageously represent from 0 to 25% by weight relative to the total mass of the catalyst in the oxide state according to the invention, preferably from 0.01 to 20% and very preferably from 0.01 to 15% by weight. The boron also advantageously represents from 0 to 25% by weight relative to the total mass of the catalyst in the oxide state according to the invention, preferably from 0.01 to 20% and very preferably from 0.01 to 15% by weight. The preferred source of phosphorus is phosphoric acid $H_3PO_4$, but its salts, and its esters such as alkaline phosphates, ammonium phosphates, are equally suitable. The phosphorus can for example be introduced in the form of a mixture of phosphoric acid and a basic organic compound containing nitrogen such as ammonia, primary and secondary amines, cyclic amines, compounds of the pyridine family, compounds of the quinolins and compounds of the pyrrole family. The phosphorus can be introduced during the shaping of the support, by co-mixing with a humid gel of alumina (hydrated aluminium oxyhydroxide) and/or in the impregnation solution. Numerous sources of silicon can be used. There can thus be used a hydrogel, an aerogel or a colloidal suspension of silicon oxide, precipitation oxides, silanes and polysilanes, siloxanes such as ethylorthosilicate $Si(OEt)_4$ and polysiloxanes, or silicates of halides such as ammonium fluorosilicate $(NH_4)_2SiF_6$ or sodium fluorosilicate $Na_2SiF_6$. The silicon can be added for example by impregnation of ethyl silicate in solution in an alcohol. The boron source can be an amorphous borate, such as ammonium biborate or pentaborate. The boron can be introduced for example by a solution of boric acid in an alcohol. The sources of elements of group VIIA which can be used are well known to a person skilled in the art. For example, fluoride anions can be introduced in the form of hydrofluoric acid or its salts. These salts are formed with alkaline metals, ammonium or an organic compound. In this latter case, the salt is advantageously formed in the reaction mixture by reaction between the organic compound and the hydrofluoric acid. It is also possible to use hydrolysable compounds that can release fluoride anions in water, such as ammonium fluorosilicate $(NH_4)_2SiF_6$, silicon tetrafluoride $SiF_4$ or sodium tetrafluoride $Na_2SiF_6$. The fluorine can be introduced for example by impregnation of an aqueous solution of hydrofluoric acid or ammonium fluoride. The chloride anions can be introduced in the form of hydrochloric acid, or of its salts. These salts are formed with alkaline metals, ammonium or an organic compound. In this latter case, the salt is advantageously formed in the reaction mixture by reaction between the organic compound and the hydrochloric acid.

The catalyst according to the invention advantageously comprises at least one metal of group VIB and at least one metal of group VIII. Even more advantageously, the catalyst of the invention is doped with phosphorus, silicon, boron or a halogen of group VIIA.

The support of the catalyst according to the invention is an organic-inorganic hybrid material (OIHM), that is to say it is constituted by an inorganic matrix also called inorganic phase and organic groups, themselves called organic phase.

The said porous oxide inorganic matrix, usually amorphous or poorly crystallized, is usually chosen from the group formed by alumina, silica and in particular mesostructured silica, silica-alumina, magnesium, clay, titanium oxide, zirconium oxide, lanthanum oxide, cerium oxide, aluminium phosphates, boron phosphates, or a mixture of at least two of the oxides mentioned above and the alumina-boron oxide combinations, alumina-titanium, alumina-zirconia and titanium-zirconia mixtures. Aluminates can also be chosen, and for example the aluminates of magnesium, calcium, barium, manganese, iron, cobalt, nickel, copper and zinc, mixed aluminates and for example those containing at least two of the metals mentioned above. Titanates can also be chosen, and for example the titanates of zinc, nickel, cobalt. Matrices containing alumina, in all its forms known to a person skilled in the art, for example gamma alumina, are preferably used. Mixtures of alumina and silica and mixtures of alumina with other compounds such as the elements of group VIB, phosphorus, fluorine or boron can also be advantageously used.

The said matrix can also contain, in addition to at least one of the compounds mentioned above, at least one synthetic or artificial simple clay of dioctahedric 2:1 phyllosilicate or trioctahedric 3:1 phyllosilicate type such as kaolinite, antigorite, chrysotile, montmorillonnite, beidellite, vermiculite, talc, hectorite, saponite, laponite. These clays can optionally be delaminated. Mixtures of alumina and clay and mixtures of silica-alumina and clay can also be used advantageously.

The said matrix can also contain, in addition at least one of the compounds mentioned above, at least one compound chosen from the group formed by the family of the molecular sieves of crystallized aluminosilicate type, synthetic and natural zeolites such as Y zeolite, fluorinated Y zeolite, Y zeolite containing rare earths, X zeolite, L zeolite, beta zeolite, small-pored mordenite, large-pored mordenite, omega zeolites, NU-10, ZSM-22, NU-86, NU-87, NU-88, and ZSM-5 zeolite. Among the zeolites, it is usually preferred to use zeolites whose silicon/aluminium (Si/Al) framework atomic ratio is greater than approximately 3/1. Zeolites of faujasite structure are advantageously used and in particular stabilized and ultrastabilized (USY) Y zeolites either in the form at least partially exchanged with metal cations, for example cations of the alkaline-earth metals and/or cations of metals of rare earths of atomic numbers 57 to 71 inclusive, or in hydrogen form (Atlas of zeolite framework types, $5^{th}$ revised Edition, 2001, Ch. Baerlocher, W. M. Meier, D. H, Oison; Zeolite Molecular Sieves Structure, Chemistry and Uses, 1973, D. W. Breck, J. Wiley and Sons).

The said matrix can also contain, in addition to least one of the compounds mentioned above, at least one compound chosen from the group formed by the family of the molecular sieves of non-crystallized aluminosilicate type such as mesoporous silicas, silicalite, silicoaluminophosphates, aluminophosphates, ferrosilicates, titanium silocoaluminates, borosilicates, chromosilicates and aluminophosphates of transition metals (including cobalt).

The shaping of the said matrix can be realized for example by extrusion, by pelleting, by the so-called drop coagulation or "oil drop" method, by revolving-plate granulation or by any other method well known to a person skilled in the art. The thus-shaped matrix is then usually dried then calcined under air, usually at a temperature of at least 100° C. and commonly in a temperature range from 200 to 1000° C. for the calcination.

The said OIHM is an OIHM of class II, that is to say the bond between the organic and inorganic phases is covalent in nature and conforms to the formula M-O—Z—R where M is at least one metal constituting the inorganic oxide matrix chosen according to the disclosure described above, Z at least one heteroelement from phosphorus and silicon from the organic precursor and R the chosen organic fraction. According to a particular form of the catalyst according to the invention, the organic groups of the hybrid support of the catalyst according to the invention are identical and come from the use of a single organic precursor.

According to another particular form of the catalyst according to the invention, the organic groups of the hybrid support of the catalyst according to the invention can be different and come from the use of at least two organic precursors, provided that the different organic precursors considered are compatible with the process for the preparation of the catalyst according to the invention, that is to say they do not react with each other and do not cause their precipitation in the initial solution, if they are simultaneously introduced into the said process for the preparation of the catalyst according to the invention.

According to the invention, the organic groups advantageously represent from 0.1 to 50 mol. %, preferably from 0.1 to 30 mol. % and very preferably from 0.1 to 20 mol. % of the hybrid support of the catalyst in the oxide state according to the invention.

According to the invention, the hybrid support constituted by an inorganic matrix and organic groups, the said inorganic matrix as described previously being itself constituted by at least one amorphous or poorly crystallized oxide and optionally combined with at least one molecular sieve (zeolitic or non-zeolitic) or with a clay, advantageously represents from 1 to 99% by weight relative to the total mass of the catalyst in the oxide state of the invention.

According to the invention, the total quantity of elements P and Si resulting from the use of an OIHM as catalyst support and optionally of doping elements advantageously represents from 0.01 to 60% by weight relative to the total mass of the catalyst in the oxide state, preferably from 0.01 to 40% and very preferably from 0.01 to 25% by weight.

The preparation of the catalyst according to the invention comprises the following stages:

a) the introduction in solution of at least one organic precursor and of the oxide inorganic matrix as described above leading to the formation of the covalent bond between the organic and inorganic phases,
b) the drying of the solid obtained in stage a) after possible isolation of this latter,
c) the mixing in solution of at least one precursor of at least one element of groups VIII and/or VB and/or VIB, optionally of at least one precursor of an element chosen from the group formed by the elements P, B, Si and halogens,
d) the impregnation of the support obtained according to stages a) and b) of the preparation process by the said solution from stage c) of this same process and maintenance of the said mixture at a temperature comprised between the ambient temperature and 90° C. for several hours,
e) drying of the moist solid obtained in stage d) of the preparation process at a temperature comprised between 80° C. and 150° C., generally under air,
f) thermal treatment of the dry solid obtained in stage e) of the preparation process at a temperature comprised between 200 and 1000° C., preferably between 300 and 700° C., generally under air.
g) sulphurization of the oxide phases of the solid obtained in stage f) in order to obtain the catalyst.

The said organic groups are introduced within the catalyst according to the invention through the use of organic precursors according to stage a) of the preparation process, the said organic precursors possessing groups that are hydrolysable and/or capable of reacting with the hydroxyl groups present on the surface of the said inorganic matrix of the catalyst of the invention. These hydrolysis/condensation reactions lead to the obtaining of the so-called OIHM of class II, that is to say to the formation of a covalent bond between the organic groups and the inorganic matrix. The organic precursors used according to the invention are characterized by hydrolysable and/or condensable groups possessing the heteroelements P or Si. Generally speaking, any organic precursor possessing hydrolysable and/or condensable groups based on the element P or Si that are capable of reacting with the hydroxyl groups present at the surface of the so-called inorganic matrix can be used according to stage a) of the process for the preparation of the catalyst according to the invention. The organic precursors possessing hydrolysable and/or condensable groups based on the element Si, also called "silylated organic precursors" in the following, are preferably characterized by the following general formula: $L_{4-x}SiR_x$ (x=1 or 2). Similarly, the organic precursors possessing hydrolysable and/or condensable groups based on the element P, also called "phosphorus-containing organic precursors" in the following, are preferably characterized by the following general formula: $L_{3-y}P(O)R_y$ (y=1 or 2). $L_{4-x}Si$ and $L_{3-y}P(O)$ are the hydrolysable and/or condensable groups of the organic precursors. L is an alkoxy group of OR' (R'=H, methyl, ethyl, alkyl) or halo type, preferably chlorine and bromine, and more preferably chlorine. The organic fraction R of the catalyst of the invention designates an organic alkyl, aryl, alkoxy, aryl-alkyl (optionally halogenated) fragment, saturated or not, branched or not and bearing or not one or more organic functional groups. The hydrocarbon-containing chain of the organic fragment H contains at least one carbon atom, more often 1 to 30 carbon atoms and preferably from 3 to 18 carbon atoms. The possible substitutions of the hydrogen on the hydrocarbon-containing chain by halides (preferably chlorine and bromine, and more preferably chlorine) can lead to wholly substituted chains. Preferably, no substitution is realized. The organic functional group or groups are preferably carboxylic acids and their derivatives, amines and their derivatives, sulphonic acids and their derivatives, thiols, polyols and their derivatives, polysulphides and their derivatives. By derivatives are meant esters, ethers, halides, also including polymerizable or polycondensable units. The organic functional groups are very preferably amines, and their derivatives. Similarly, the organic functional groups are very preferably alcohols, and their derivatives.

The reaction of the said organic precursors with the inorganic matrix of the catalyst of the invention corresponds to a stage of post-treatment of a pre-formed inorganic material. This is also described as grafting of organic precursors on the surface of an inorganic solid.

According to the invention, Z can be phosphorus or silicon.

A preferred catalyst is based on an OIHM in which Z is silicon and containing a metal of group VIB and a metal of group VIII. Advantageously, the metal of group VIB is tungsten or molybdenum and the metal of group VIII is cobalt or nickel. Even more advantageously, the metal of group VIB is tungsten.

When Z is silicon, another preferred catalyst also contains a doping element chosen from the group constituted by the elements phosphorus, silicon, boron and halogens of group VIIA, and the doping element is even more preferably phosphorus, silicon or boron.

A preferred catalyst is based on an OIHM in which Z is phosphorus and containing a metal of group VIB and a metal of group VIII. Advantageously, the metal of group VIB is tungsten or molybdenum and the metal of group VIII is cobalt or nickel.

When Z is phosphorus, another preferred catalyst also contains a doping element chosen from the group constituted by the elements phosphorus, silicon, boron and halogens of group VIIA, and the doping element is even more preferably phosphorus, silicon or boron.

Very preferably, the catalyst according to the invention contains from 0.01 to 40% by weight of molybdenum or tungsten oxide, from 0.01 to 25% by weight of cobalt or nickel oxide, from 0.01 to 15% by weight of $P_2O_5$, the compositions being expressed relative to the mass of the final catalyst in oxide form.

According to stage a) of the process for the preparation of the catalyst of the invention, the solution used can be aqueous, organic or aquo-organic depending on the nature of at least one organic precursor used. The organic solvents can be alcohols (methanol, ethanol, propanol) or any other organic solvent such as dichloromethane, toluene, tetrahydrofuran, etc. The aquo-organic solutions are preferably water-alcohol mixtures. The associated reaction temperatures are comprised in a temperature range running from the ambient temperature up to the boiling temperature of the solvent chosen according to the nature of at least one of the organic precursors. The choice of at least one organic precursor can also lead to the realization of the reaction according to stage a) of the preparation process according to the invention in anhydrous organic medium making it necessary to operate in so-called inert conditions well known to a person skilled in the art.

According to stage d) of the preparation process according to the invention, the impregnation of the OIHM can be realized by the methods of impregnation well known to a person skilled in the art, such as dry, equilibrium absorption or reflux adsorption impregnation. Similarly, this impregnation can be carried out in a single stage, by a solution containing all of the elements constituting the sulphide active phase of the final catalyst, or in several stages.

The impregnation is preferably realized by the so-called dry impregnation method. The solution used during this impregnation contains the precursors of the active phase in any form known to a person skilled in the art. These can be present in different chemical entities or within the same chemical entity. For example, it is possible to use salts of heteropolyacides as described in the document U.S. Pat. No. 2,547,380.

It is possible of carry out each of the previous stages c) to f) several times, separately or in combination with at least another of the previous stages c) to f) as is known to a person skilled in the art. For example, it is possible to carry out stages d) and e) at least two times in succession. Similarly, a possible variant of the process for the preparation of the catalyst of the invention is to carry out stage d) and optionally stage e) of the preparation process according to the invention using the non-modified chosen inorganic matrix and then, in a second step, carry out carry out stages a) and b) of the preparation process according to the invention. In this particular case, the impregnation of stage d) of the preparation process according to the invention can be carried out at least in part during the mixing which serves to shape the inorganic matrix. Preferably, this stage is carried out after shaping and calcination of the said inorganic matrix.

After preparation as described previously, the catalyst according to the invention is in the form of oxide phases. The said catalyst must therefore undergo a sulphurization stage generating the active sulphide phase. This can be carried out by processes well known to a person skilled in the art, in the unit itself using a feedstock in the presence of hydrogen and of hydrogen sulphide introduced as such or from the decomposition of an organic sulphurous compound (when it is called in-situ sulphurization) or prior to the loading of the catalyst into the unit (when it is called ex-situ sulphurization). In the case of "in-situ" sulphurization, the following sulphurous compounds can be added so as to increase the sulphur content of the feedstock: dimethyldisulphide, dimethylsulphide, n-butylmercaptan, polysulphide compounds of tertiononylpolysulphide type (for example TPS-37 or TPQ-54 marketed by the company ARKEMA), etc.

Depending on the temperature level, it may be that during the thermal treatment of stage f) the organic compounds of the support are totally or partly eliminated but the M-O—Z bond remains and favourably modifies the support/active phases interactions. Thus, although the organic precursor may be eliminated during the thermal treatment, its presence at the time of the impregnation of the support (stage d) favourably modifies the interactions between the support and the metal precursor(s) of the active phase. In all cases, the residual presence of the atoms of Si and P constitutes an "imprint" of the organic group which has a positive influence on the formation of the final active metal phase.

The catalysts according to the present invention are used for the hydrorefining and hydroconversion of hydrocarbon-containing feedstocks such as petroleum fractions, fractions from coal or hydrocarbons produced from natural gas, the said feedstocks optionally containing metals and/or nitrogen and/or oxygen and/or sulphur. In these utilisations, the catalysts according to the present invention present an improved activity and selectivity compared with the prior art (without support based on OIHM).

More particularly, the feedstocks used in the process are atmospheric distillates, gasolines (in particular FCC gasolines) or gas oils (in particular "straight-run" gas oils), vacuum distillates, vacuum gas oils, atmospheric residues, vacuum residues, heavy fuel oils, oils, waxes and paraffins, used oils, deasphalted residues or crudes, feedstocks from thermal or catalytic conversion processes and their mixtures. These feedstocks can also be synthetic feedstocks from for example biomass treatment. They generally contain heteroatoms such as sulphur and/or oxygen and/or nitrogen and/or at least one metal.

The operating conditions which can be applied in these processes are usually: a temperature of 180 to 450° C. (preferably between 250 and 440° C.), a total pressure of 0.5 to 30 MPa (preferably between 1 and 40 MPa), an hourly volume rate of 0.1 to 20 $h^{-1}$ (preferably between 0.2 and 5 $h^{-1}$), a hydrogen/feedstock ratio expressed in volume of hydrogen, measured under normal temperature and pressure conditions, for a liquid feedstock volume generally of 50 l/l to 2000 l/l, The catalysts of the present invention can be also advantageously used during the pre-treatment of catalytic cracking feedstocks and in a first stage of a mild hydrocracking or hydroconversion, taking place with an acid catalyst, zeolitic or non-zeolitic, for the second stage of the treatment.

The invention is illustrated by means of the following examples.

EXAMPLES

The following examples specify the invention without, however, limiting its scope. For all the examples of preparation of catalysts of the present invention, an alumina was used as base support.

Example 1

Preparation of a CoMo-Type Catalyst A in the Oxide State, not According to the Invention The molybdenum and cobalt are co-dry-impregnated in two stages in aqueous medium on a commercial gamma alumina support (specific surface area: 250 $m^2/g$). The precursor salt of molybdenum is ammonium heptamolybdate $(NH_4)_6Mo_7O_{24}, 4H_2O$, the precursor salt of cobalt is cobalt nitrate $Co(NO_3)_2, 6H_2O$. A 2-hour drying stage at 120° C. is carried out intermediately between the two dry impregnations. After a maturation of 2 hours, the extrudates are dried to 100° C. for a night, then calcined under oxygen at 500° C. for 4 hours. On this non-sulphur-containing $Co—MoO_3/Al_2O_3$ catalyst, the molybdenum oxide content is 13.3% and the cobalt oxide content is 3.3%. This catalyst A is representative of an industrial catalyst and is not according to the invention. It is used in sulphide form in hydrotreatment.

Example 2

Preparation of a CoMo-Type Catalyst E in the Oxide State, not According to the Invention The same catalyst preparation procedure as for Example 1 (catalyst A not according to the invention) was used except that inorganic silicon in the form of silicic acid was introduced into the metals-impregnation solution.

Catalyst E contains 13.3% of molybdenum oxide, 3.3% of cobalt oxide and 1% of Si by weight. This catalyst does not contain an OIHM-type support with a M-O—Z—R bond, but silicon or phosphorus in inorganic form is introduced as doping agent. It will be used in its sulphide form in hydrotreatment.

Example 3

Preparation of CoMo-type catalysts B and B' in the Oxide State Via the Functionalization by Grafting of an $Al_2O_3$ Support by the Organic Molecule $(CH_3)_3SiOCH_3$ at 1.9 mol.-% Relative to the Catalyst in its Oxide Form, According to the Invention 50 g of alumina γ in the form of extrudates are introduced into a 500-ml Schlenk flask and placed under vacuum at 40° C. for 4 h. 1.52 g (14.6 mmol) of trimethylmethoxysilane $(CH_3)_3SiOCH_3$ in solution in 360 ml of anhydrous and distilled toluene are then added under inert argon atmosphere. The mixture is brought to reflux for 7 h at 110° C. After a return to ambient temperature, the extrudates are isolated by filtration, washed with 4×100 ml of anhydrous and distilled toluene then oven-dried under air for 12 hours at 140° C. The thus-obtained organic-inorganic hybrid alumina support is impregnated in excess with a volume of solution equal to 4 times the water take-up volume of the support. The said solution contains the heteropolycompound $(Co^{2+})_3$ $Co_2Mo_{10}O_{38}H_4^{6-}$ (also called $CoMo_{10}(Co)$) and can by way of example be obtained according to the procedure set out by the patent EP1393802A1. The mixture is maintained under agitation for 24 h at ambient temperature. After filtration, the extrudates are oven-dried under air for 12 hours at 140° C. The thus-obtained dried catalyst is catalyst B'. Half of catalyst B' is then calcined under air dry at 450° C. for 2 h (temperature gradient 5° C/min, dry-air flow rate 1.5 l/g of solid/h). The characteristics of the catalyst B obtained according to the invention are the following: the grafts content corresponds to 1.9 mol.-% of the catalyst in the oxide state according to the invention, and the percentages by mass of $MoO_3$ and of $CoO$ relative to the final catalyst in its oxide form that are obtained are respectively 13.2 and 3.2% by weight. The phosphorus content contributed by the graft is 1% by weight. These catalysts B and B' which will be used in their sulphide form in hydrotreatment are according to the invention.

Example 4

Preparation of a CoMoP-type Catalyst C in the Oxide State Via the Functionalization by Grafting of an $Al_2O_3$ Support by the Organic Molecule $(CH_3)_3SiOCH_3$ at 2.9 mol.-% Relative to the Catalyst in its Oxide Form, According to the Invention 25 g of alumina γ in the form of extrudates are introduced into a 250-ml Schlenk flask and placed under vacuum at 40°

C. for 4 h. 1.83 g (17.6 mmol) of trimethylmethoxysilane $(CH_3)_3SiOCH_3$ in solution in 180 ml of anhydrous and distilled toluene are then added under inert argon atmosphere. The mixture is raised to reflux for 7 h at 110° ° C. After a return to ambient temperature, the extrudates are isolated by filtration, washed with 4×50 ml of anhydrous and distilled toluene then oven-dried under air for 12 hours at 140° C. An aqueous solution of 23 ml containing 4.6 g of $MoO_3$, 2.1 g of phosphoric acid and 1.2 g of $Co(OH)_2$ is raised to reflux at 85° C. accompanied by stifling until complete dissolution of the reagents, this preparation leading to the formation of the heteropolyanion $(Co^{2+})_3P_2Mo_5O_{23}^{6-}$. After a return to ambient temperature, the functionalized support is impregnated with this impregnation solution. The percentages by mass of CoO, of $MoO_3$, and of $P_2O_5$ compared with the final catalyst in its oxide form are respectively 2.7/13.1/3.7 wt.-%. After maturation, the extrudates are oven-dried under air for 12 hours at 140° C. then calcined under dry air at 450° C. for 2 h (temperature gradient 5° C/min, dry-air flow-rate 1.5l/g of solid/h). The grafts content corresponds to 2.9 mol.-% of the catalyst in the oxide state according to the invention. The catalyst C which will used in its sulphide form in hydrotreatment is according to the invention.

Example 5

Preparation of a CoMo-Type Catalyst D in the Oxide State Via the Functionalization by Grafting of an $Al_2O_3$ Support by the Organic Molecule $(OH)_2OP(CH_2)_3$ at 14.4 mol.-% Relative to the Catalyst in its Oxide Form, According to the Invention 25 g of alumina γ in the form of extrudates are added to 11.15 g of propylphosphonic acid $(OH)_2OP(CH_2)_3$ in solution in 460 ml of a 95:5 v:v binary water:methanol mixture. The pH of the solution is then set at 6±0.1 with the help of a 1 N soda solution. The mixture is stirred at ambient temperature for 72 h. The extrudates are isolated by filtration, washed with 5×40 ml of methanol then oven-dried under air for 12 hours at 140° C. The modified support according to the invention is then dry-impregnated in two stages with intermediate drying.

The molybdenum and the cobalt are co-co-dry-impregnated in two stages in aqueous medium on the hybrid support of the invention. The precursor salt of molybdenum is ammonium heptamolybdate $(NH_4)_6Mo_7O_{24}, 4H_2O$, the precursor salt of cobalt is cobalt nitrate $Co(NO_3)_2, 6H_2O$. A 2-hour drying stage at 120° C. is carried out intermediately between the two dry impregnations. After a maturation of 2 hours, the extrudates are dried at 100° C. for a night, then calcined under oxygen at 500° C. for 4 hours. On this non-sulphured Co—$MoO_3/Al_2O_3$ catalyst, the molybdenum oxide content is 13.0% and the cobalt oxide content is 3.3%. The grafts content corresponds to 14.4 mol. % of the catalyst in the oxide state according to the invention. This catalyst D, which will be used in its sulphide form in hydrotreatment, is representative of a catalyst according to the invention.

Example 6

Preparation of a CoMo-Type Catalyst F in the Oxide State, not According to the Invention The same catalyst preparation procedure as for Example 1 (comparative catalyst A) was used except that inorganic phosphorus in the form of phosphoric acid was introduced into the metals-impregnation solution.

The final composition of the catalyst F is 13.0% by weight molybdenum oxide, 3.3% cobalt oxide and 1.6% of phosphorus.

This is identical to that of catalyst D.

This catalyst will be used in its sulphide form in hydrotreatment.

Example 7

Comparison of the Catalysts A. B, C. D and F in Hydrogenation of Toluene in Cyclohexane Under Pressure in the Presence of Hydrogen Sulphide The form of the catalysts A, B, C, D, E, F previously described that is active in hydrotreatment is obtained by dynamic in-situ sulphurization in the swept-fixed-bed tubular reactor of a Catatest-type-type pilot plant (built by: Geomécanique), the fluids travelling from top to bottom. The hydrogenating activity measurements are carried out immediately after the sulphurization under pressure without re-exposure to the air with the hydrocarbon-containing feedstock which was used to sulphurize the catalysts. The sulphurization and test feedstock is comprised of 5.8% dimethyldisulphide (DMDS), 20% toluene and 74.2% cyclohexane (by weight). The stabilized catalytic activities of equal volumes of catalysts A, B, C, D, E, F in the toluene hydrogenation reaction are thus measured.

The activity measurement conditions are the following:

| | |
|---|---|
| Total pressure: | 6.0 MPa |
| Toluene pressure: | 0.38 MPa |
| Cyclohexane pressure: | 1.55 MPa |
| Hydrogen pressure: | 3.64 MPa |
| $H_2S$ pressure: | 0.22 MPa |
| Catalyst volume: | 40 $cm^3$ |
| Flow-rate of feedstock: | 80 $cm^3/h$ |
| Hourly volume rate: | 211/l/h$^{-1}$ |
| Hydrogen flow-rate: | 36 l/h |
| Sulphurization and test temperature: | 350° C. (gradient 3° C./min) |

Samples of the liquid effluent are analysed by gas-phase chromatography. The determination of the molar concentrations in non-converted toluene (T) and of the concentrations of the hydrogenation products (methylcyclohexane (MCC6), ethylcyclopentane (EtCC5) and dimethylcyclopentanes (DMCC5)) allow calculation of a level of toluene hydrogenation XHYD defined by:

$$X_{HYD}\ (\%) = 100 * \frac{(MCCC6 + EtCC5 + DMCC5)}{(T + MCC6 + EtCC5 + DMCC5))}$$

As the toluene hydrogenation reaction is of order 1 in the test conditions used and the reactor behaves like an ideal piston reactor, the hydrogenating activity AHYD of the catalysts is calculated by applying the formula:

$$AHYD = \ln(100/(100 - XHYD))$$

Table 1 compares the relative hydrogenating activities, equal to the ratio of the activity of the catalyst considered to the activity of the reference catalyst A (100% activity).

TABLE 1

Relative hydrogenation activities of the catalysts B, C, D (according to the invention) and E and F (not according to the invention) compared with those of catalyst A (not according to the invention)

| Catalyst | AHYD with iso-content of $MoO_3$ catalyst relative to A |
|---|---|
| B | 130 |
| B' | 145 |
| E | 105 |
| C | 155 |
| D | 120 |
| F | 107 |

Surprisingly, Table 1 shows the substantial increase in activity obtained on the catalysts according to the invention compared with the reference catalyst and catalysts E and F (not according to the invention) prepared on an unmodified support.

Example 8

Comparison of Catalysts A, B, C, D, E and F in Terms of Selective Hydrodesulphurization of a Standard Model FCC Gasoline Feedstock The catalysts A, B, C, D, E and F previously described were also compared in selective desulphurization tests on a standard model FCC gasoline feedstock. The test is carried out in a Grignard-type reactor (batch reactor) at 200° C. under a pressure of 3.5 MPa with hydrogen kept constant. The model feedstock is constituted by 1000 ppm of methyl-3 thiophene and 10% by weight of dimethyl 2,3-butene-2 in n-heptane. The solution volume is 210 cm³ when cold, the catalyst mass tested being 4 grams (before sulphurization). Before the test, the active phase of the catalysts is formed by sulphurization-bank sulphurization, under a $H_2S/H_2$ mixture (4 l/h, 15% by vol of $H_2S$) at 400° C. for two hours (gradient 5° C./min), then reduced under pure $H_2$ to 200° C. for two hours. The catalyst in its sulphide form is then transferred into the Grignard reactor sheltered from the air.

The velocity constant (standardized per g of catalyst) is calculated assuming an order 1 for the desulphurization reaction ($k_{HDS}$), and an order 0 for the hydrogenation reaction ($k_{HDO}$). The selectivity of a catalyst is defined by the ratio of its velocity constants, $k_{HDS}/k_{HDO}$. The relative velocity constants of the catalysts A, B, C, D, E, F as well as their selectivities are given in Table 2.

TABLE 2

Relative velocity constants and selectivities of the catalysts B, C, D (according to the invention) and E and F (not according to the invention) compared with those of catalyst A (not according to the invention).

| Catalyst | $k_{HDS}$ | $K_{HDO}$ | $k_{HDS}/k_{HDO}$ |
|---|---|---|---|
| A | 1.0 | 2.2 | 0.45 |
| B | 1.27 | 2.5 | 0.51 |
| E | 1.0 | 2.4 | 0.42 |
| C | 1.5 | 2.7 | 0.56 |
| D | 1.2 | 2.4 | 0.5 |
| F | 0.9 | 2.3 | 0.39 |

Surprisingly, catalysts B, C, D prove to be both more active in desulphurization and more selective than catalysts A, E and F (not according to the invention).

Example 9

Comparison of the Catalysts A, B, B', C, D and F in Hydrodesulphurization of Straight-Run Gas Oil The catalysts A, B and B', C, D, E and F previously described were also compared in a hydrodesulphurization test of a gas oil, the principal characteristics of which are given below:

| | |
|---|---|
| Density at 15° C.: | 0.8522 |
| Sulphur: | 1.44% by weight |
| Simulated distillation: | |
| IBP: | 155° C. |
| 10%: | 247° C. |
| 50%: | 315° C. |
| 90%: | 392° C. |
| FBP: | 444° C. |

The test is carried out in a swept-fixed-bed isothermal pilot plant reactor, the fluids travelling from bottom to top. The active phase of the catalysts is formed by in-situ sulphurization at 350° C. in the unit under pressure by means of the gas oil of the test to which is added 2% by weight of dimethyldisulphide, the hydrodesulphurization test was carried out under the following operating conditions:

| | |
|---|---|
| Total pressure: | 7 MPa |
| Catalyst volume: | 30 cm³ |
| Temperature: | 340° C. |
| Hydrogen flow-rate: | 24 l/h |
| Feedstock flow-rate: | 60 cm³/h |

The catalytic performances of the catalysts tested are given in the following table. They are expressed in terms of relative activity, taking that of catalyst A as equaling 100 and in consideration of the fact that they are of apparent order 1.5 relative to sulphur. The relationship linking the activity and hydrodesulphurization conversion (% HDS) is the following:

$$AHDS = \sqrt{\frac{100}{(100 - \% \ HDS)}} - 1$$

TABLE 3

Relative activities in hydrodesulphurization of direct distillation gas oil of the catalysts B, C, D (according to the invention) and E and F (not according to the invention) compared with those of catalyst A (not according to the invention)

| Catalyst | AHDS with iso-volume relative to A |
|---|---|
| B' | 134 |
| B | 125 |
| E | 103 |
| C | 150 |
| D | 120 |
| F | 105 |

Surprisingly, the table shows the substantial increase in activity that is obtained on the catalysts prepared according to the invention compared with the reference catalyst and all those not according to the invention.

Example 10

Comparison of the Catalysts A. B. C. D, E and F in Hydrotreatment of Vacuum Distillates The catalysts A, B, C, D, E and F previously described were also compared in a hydrotreatment test of a vacuum distillate, the principal characteristics of which are given below:

| | |
|---|---|
| Density at 20° C.: | 0.9365 |
| Sulphur: | 2.92% by weight |
| Total nitrogen: | 1400 ppm by weight |
| Simulated distillation: | |
| IBP: | 361° C. |
| 10%: | 430° C. |
| 50%: | 492° C. |
| 90%: | 567° C. |
| FBP: | 598° C. |

The test is carried out in a swept-fixed-bed isothermal pilot plant reactor, the fluids travelling from bottom to top. The active phase of the catalysts is formed by in-situ sulphurization at 350° C. in the unit under pressure by means of a direct-distillation gas oil to which is added 2% by weight of dimethyldisulphide, the hydrodesulphurization test was carried out under the following operating conditions:

| | |
|---|---|
| Total pressure: | 12 MPa |
| Catalyst volume: | 40 cm3 |
| Temperature: | 380° C. |
| Hydrogen flow-rate: | 40 l/h |
| Feedstock flow-rate: | 40 cm3/h |

The catalytic performances of the catalysts tested are given in the following Table 4. They are expressed in terms of relative activity, taking that of catalyst C5 as equaling 100 and in consideration of the fact that they are of order 1.5. The relationship linking the activity and the hydrodesulphurization conversion (% HDS) is the following:

$$AHDS = \sqrt{\frac{100}{(100 - \% \, HDS)} - 1}$$

The same relationship is applicable for hydrodenitrification (% HDN and AHDN). Moreover, the conversion of crude into a fraction having a boiling point below 380° C. obtained with each catalyst is also evaluated. It is expressed on the basis of the simulated distillation results (ASTM method D86) by the relationship:

Conversion=(%380+feedstock−%380−effluent)/%380+feedstock

TABLE 4

Relative activities at iso-volume in hydrodesulphurization of straight-run gas oil of the catalysts B, C, D (according to the invention) and E and F (not according to the invention) compared with those of catalyst A (not according to the invention)

| Catalyst | Relative AHDS at isovolume compared with A | Relative AHDN at isovolume compared with A | Conversion 380° C. - (%) |
|---|---|---|---|
| A | 100 | 100 | 25 |
| B | 115 | 118 | 27 |
| E | 97 | 103 | 25 |
| C | 145 | 150 | 30 |
| D | 115 | 120 | 27 |
| F | 99 | 105 | 25 |

Surprisingly, Table 4 shows the substantial increase in activity that is obtained on the catalysts prepared according to the invention compared with the reference catalyst and all those not according to the invention.

The invention claimed is:

1. Supported catalyst, the said catalyst comprising:
a porous support constituted by an organic-inorganic hybrid material (OIHM), the said OIHM having a covalent bond between the organic and inorganic phases, the said bond conforming to the formula M-O—Z—R where M represents at least one metal constituting the inorganic phase, Z at least one heteroelement from phosphorus and silicon from one or more organic precursor (s) and R an organic fragment of alkyl, aryl, alkoxy, aryl-alkyl type, saturated or not, branched or not, and bearing or not one or more organic functional groups,
at least one metal of group VIB and/or of group VB and/or of group VIII, the metal of group VIB being chosen from chromium, molybdenum and tungsten, the metal of group VB from vanadium, niobium and the metal of group VIII from iron, cobalt, nickel, ruthenium, palladium, osmium, iridium and platinum,
said catalyst having an active sulphide phase with the provision that the catalyst contains in % by weight, relative to the mass of the catalyst in oxide form, from 0.01 to 40% by weight of molybdenum oxide or tungsten oxide, from 0.01 to 25% by weight of cobalt oxide or nickel oxide, and from 0.01 to 15% by weight of $P_2O_5$.

2. Catalyst according to claim 1, in which the metal of group VIII further comprises at least one of iron, palladium and iridium.

3. Catalyst according to claim 1, in which the said fragment R bears at least one organic functional group.

4. Catalyst according to claim 1, in which the said fragment R does not bear an organic functional group.

5. Catalyst according to claim 1, in which the said heteroelement Z is phosphorus.

6. Catalyst according to claim 1, in which the said heteroelement Z is silicon.

7. Catalyst according to claim 6, in which the said organic precursor(s) conform(s) to the general formula $L_{4-x}SiR_x$ with x=1 or 2, L being an alkoxy group of OR' (with R'=H, methyl, ethyl, alkyl) or halo type, R an alkyl, aryl, alkoxy, aryl-alkyl organic fragment.

8. Catalyst according to claim 1, also containing a doping element chosen from the group constituted by the elements phosphorus, silicon, boron and halogens of group VIIA.

9. Catalyst according to claim 1, in which the inorganic phase of the porous support is chosen from the group formed by alumina, mixtures of alumina and silica and mixtures of alumina with at least one of the elements of the group formed by chromium, molybdenum, tungsten, phosphorus, fluorine and boron.

10. Catalyst according to claim 1, in which the inorganic phase of the porous support also contains at least one compound chosen from the molecular sieves of crystallized aluminosilicate type.

11. Catalyst according to claim 1, in which the inorganic phase of the porous support also contains at least one compound chosen from the molecular sieves of non-crystallized aluminosilicate type.

12. Catalyst according to claim 1, in which the inorganic phase of the porous support also contains at least one clay of dioctahedric 2:1 phyllosilicate or trioctahedric 3:1 phyllosilicate type.

13. A catalyst according to claim 1, prepared by a process comprising the following stages:
  a) the introduction in solution of at least one organic precursor and of an oxide inorganic matrix leading to the formation of the covalent bond between the organic and inorganic phases,
  b) the drying of the solid obtained in stage a),
  c) the mixing in solution of at least one precursor of at least one element of groups VIII and/or VB and/or VIB,
  d) the impregnation of the support obtained according to stages a) and b) of the preparation process by the said solution from stage c) of this same process and maintenance of the said mixture at a temperature comprised between the ambient temperature and 90° C. so as to obtain a moist solid,
  e) drying of the moist solid obtained in stage d) of the preparation process at a temperature comprised between 80° C. and 150° C.,
  f) thermal treatment of the dry solid obtained in stage e) of the preparation process at a temperature comprised between 200 and 1000° C.,
  g) sulphurization of the oxide phases of the solid obtained in stage f) in order to obtain the catalyst.

14. Supported catalyst, the said catalyst comprising:
  a porous support constituted by an organic-inorganic hybrid material (OIHM), the said OIHM having a covalent bond between the organic and inorganic phases, the said bond conforming to the formula M—O—Z—R where M represents at least one metal constituting the inorganic phase, Z at least one heteroelement from phosphorus and silicon from one or more organic precursor(s) and R an organic fragment of alkyl, aryl, alkoxy, aryl-alkyl type, saturated or not, branched or not, and bearing or not one or more organic functional groups,
  at least one metal of group VIB and/or of group VB and/or of group VIII, the metal of group VIB being chosen from chromium, molybdenum and tungsten, the metal of group VB from vanadium, niobium and the metal of group VIII from iron, cobalt, nickel, ruthenium, palladium, osmium, iridium and platinum, and the catalyst with the active sulphide phase being obtained by sulphurization of the oxide phases
  with the proviso that said organic precursor(s) conform(s) to the general formula $L_{3-y}P(O)R_y$ with y=1 or 2, L being an alkoxy group of OR' (with R'=H, methyl, ethyl, alkyl) or halo type, R an organic fragment bearing an organic functional group from any of carboxylic acid and their derivatives, amines and their derivatives, sulphonic acids and their derivatives, the thiols, polyols and their derivatives, polysulphides and their derivatives.

15. Catalyst according to claim 14, in which the organic fragment R contains from 1 to 30 carbon atoms.

16. Catalyst according to claim 14, comprising at least one metal of group VIB and at least one metal of group VIII.

17. Catalyst according to claim 14 containing a metal of group VIB chosen from molybdenum and tungsten and a metal of group VIII chosen from nickel and cobalt.

18. Catalyst according to claim 17, containing, as metal of group VIB, tungsten and at least one metal of group VIII chosen from cobalt and nickel.

19. Catalyst according to claim 14, also containing a doping element chosen from the group constituted by the elements phosphorus, silicon and boron.

20. A catalytic process of hydrorefining or hydroconversion of a hydrocarbon-containing feedstock operating at a temperature comprised between 180 and 450° C., a total pressure of 0.5 to 30 MPa, an hourly volume rate of 0.1 to 20 $h^{-1}$, in the presence of hydrogen with a hydrogen/liquid feedstock ratio of 50 to 2000 Nl/l, wherein the catalyst is supported catalyst, the said catalyst comprising:
  a porous support constituted by an organic-inorganic hybrid material (OIHM), the said OIHM having a covalent bond between the organic and inorganic phases, the said bond conforming to the formula M—O—Z—R where M represents at least one metal constituting the inorganic phase, Z at least one heteroelement from phosphorus and silicon from one or more organic precursor(s) and R an organic fragment of alkyl, aryl, alkoxy, aryl-alkyl type, saturated or not, branched or not, and bearing or not one or more organic functional groups,
  at least one metal of group VIB and/or of group VB and/or of group VIII, the metal of group VIB being chosen from chromium, molybdenum and tungsten, the metal of group VB from vanadium, niobium and the metal of group VIII from iron, cobalt, nickel, ruthenium, palladium, osmium, iridium and platinum,
  said catalyst having an active sulphide phase with the provision that the catalyst contains in % by weight, relative to the mass of the catalyst in oxide form, from 0.01 to 40% by weight of molybdenum oxide or tungsten oxide, from 0.01 to 25% by weight of cobalt oxide or nickel oxide, and from 0.01 to 15% by weight of $P_2O_5$.

21. Process according to claim 20, operating at a temperature comprised between 250 and 440° C., a total pressure between 1 and 18 MPa, an hourly volume rate of 0.2 to 5 $h^{-1}$, in the presence of hydrogen with a hydrogen/liquid feedstock volume ratio of 50 to 2000 NM.

22. Process according to claim 20, in which the hydrotreated hydrocarbon-containing feedstock is chosen from atmospheric distillates, gasolines, gas oils, vacuum distillates, gas oils from vacuum distillation, atmospheric residues, vacuum residues, heavy fuel oils, oils, waxes, paraffins, used oils, deasphalted residues or crudes, feedstocks from thermal or catalytic conversion processes and their mixtures.

23. Process according to claim 20, in which the feedstock hydrocarbon-containing feedstock is a synthetic feedstock from the treatment of biomass.

24. A process according to claim 20, in which said organic precursor(s) conform(s) to the general formula $L_{3-y}P(O)R_y$, with y=1 or 2, L being an alkoxy group of OR' (with R'=H, methyl, ethyl, alkyl) or halo type, R an alkyl, aryl, alkoxy, aryl-alkyl organic fragment.

* * * * *

UNITED STATES PATENT AND TRADEMARK OFFICE
CERTIFICATE OF CORRECTION

PATENT NO. : 8,435,912 B2
APPLICATION NO. : 12/375757
DATED : May 7, 2013
INVENTOR(S) : Chaumonnot et al.

It is certified that error appears in the above-identified patent and that said Letters Patent is hereby corrected as shown below:

In the Claims:

Column 20, line 49 reads "volume ratio of 50 to 2000 NM." should read -- volume ratio of 50 to 2000 Nl/I. --

Signed and Sealed this
Sixteenth Day of July, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,435,912 B2  Page 1 of 1
APPLICATION NO. : 12/375757
DATED : May 7, 2013
INVENTOR(S) : Chaumonnot et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1131 days.

Signed and Sealed this
Eighth Day of September, 2015

Michelle K. Lee
*Director of the United States Patent and Trademark Office*